Patented Dec. 5, 1944

2,364,438

UNITED STATES PATENT OFFICE 2,364,438

PREPARATION OF ORGANIC ESTERS

William F. Gresham, Wilmington, Del., assignor to E. I. du Pont de Nemours & Company, Wilmington, Del., a corporation of Delaware No Drawing. Application July 26, 1941, Serial No. 404,158

5 Claims. (Cl. 260—484)

This invention relates to a process for the preparation of organic esters and their corresponding acids and more particularly to the preparation of such compounds by the interaction of cyclic acetals, such as, 1,3-dioxolane with carbon monoxide.

An object of the present invention is to provide an improved process for the preparation of aliphatic, aromatic, cyclic, and alicyclic acid esters and their acids and more particularly such glycolic acid esters and their acids in which the hydrogen of the hydroxyl group has been replaced by a functional group. Another object of the invention is to provide an economical process for the preparation of alkoxy substituted acids both linear and cyclic from inexpensive raw materials. Yet another and more specific object of the invention is to provide a process for the preparation of oxy substituted esters from carbon monoxide and cyclic acetals, their polymers, and substitution products. A further object is to provide suitable catalysts for these processes. Other objects and advantages of the invention will hereinafter appear.

The objects, and other advantages of the invention which will hereinafter be more fully appreciated, are realized by the interaction of cyclic acetals with carbon monoxide in the presence of a suitable catalyst. The reaction may be generically illustrated as proceeding substantially in accord with the following equation:

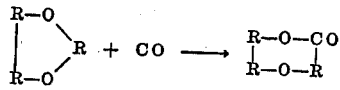

in which the R groups are similar or dissimilar alkylene groups. It is known that some of the cyclic acetals are polymerizable to give linear polymers and these polymers likewise can be reacted with carbon monoxide to form esters which reaction may be generically illustrated by the following equation:

HOR(OROR)$_x$OH+CO→HOR(ORCOOR)$_x$OH in which likewise the R groups are similar or dissimilar alkyl or alkylene groups and $x$ is a positive integer. These reactions go with facility over a wide range of temperatures as will be more fully particularized hereinafter and although the generic equations above illustrated indicate the addition of but one mole of carbon monoxide per mole of the compound added thereto, polycarboxylic compounds may likewise be formed by the introduction of a plurality of moles of carbon monoxide per mole of the compound reacted, and this is especially true if polymeric cyclic formals are condensed with carbon monoxide.

The following equation illustrates more specifically the process with particular reference to the interaction of the cyclic acetal, 1,3-dioxolane with carbon monoxide:

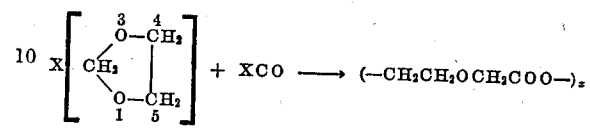

in which X is a positive integer. In a similar manner substituted 1,3-dioxolanes may be reacted to form similar substituted products and it appears to make little difference in the case of conducting the reaction whether the substitution be alkyl, aryl, or aralkyl in the 2, 4, or 5 positions.

Generally it may be stated that the reaction can be conducted by placing the cyclic acetal or polymer thereof in a suitable reaction vessel, an acidic type catalyst added, such, for example, as boron trifluoride, the vessel closed and carbon monoxide introduced. Due to the facility with which this reaction goes, no heat need generally be applied to the vessel, but, in many instances, due to the exothermic heat of reaction, precautions should be taken to prevent the temperature of the reaction from rising to such a degree that decomposition of the reactants or products results.

The reaction may be effected at temperatures ranging from well below room temperature to in the neighborhood of 300° C., the preferred range for the interaction is between 10 and 200° C. Atmospheric pressures may be employed, although in order to increase the velocity of the reaction, it is recommended that pressures in excess of atmospheric be employed. Thus elevated pressures ranging between 5 atmospheres and 1000 atmospheres are suitable, with a preferred range between 30 and 700 atmospheres. While specific ranges of temperatures and pressures have been indicated, the reaction may be carried out over a considerable range of temperatures and pressures, the optimum conditions being determined by the particular cyclic acetal or polymer thereof reacted and the activity and the concentration of the catalyst employed.

As may be inferred from the above generic formulas, a large number of cyclic acetals and their polymers together with related compounds may be reacted with carbon monoxide in accord with my invention, and among those included may be specifically named for the purpose of example the following: 1,3-dioxolane and its substituted products such, for example, as 2-methyl-1,3-dioxolane; 2,2-dimethyl-1,3-dioxolane; 4-methyl-1,3-dioxolane; 4,5-dimethyl-1,3-dioxolane; 2-methyl-4-methyl-1,3-dioxolane and other substituted dioxolanes; dioxane, 1,3-dioxane and their substitution products wherein one or more of the hydrogens of the methylene groups are substituted by alkyl groups, such as methyl, ethyl, propyl, and butyl; 1,3-glycol formal; dioxole; and the dioxines. Polymers both linear and cyclic of these products and especially the polymeric cyclic formals and the polymers obtained from 1,3-dioxolane and their substitution and addition products can similarly be reacted with carbon monoxide, the latter being obtained by polymerizing the cyclic formals in the presence of alcohols, esters, acids, amines, imines, and the like. The polymers prepared in accord with the process disclosed in U. S. applications Ser. Nos. 392,124; 392,125; 392,126; 392,127; 392,128 may be similarly reacted to obtain valuable products. These polymers include in S. N. 392,124: the polymers obtained by the polymerization of 1,3-dioxolane in the presence of acid catalysts; in S. N. 392,125: the polymers resulting from the reaction of a vicinal glycol with an aldehyde in the presence of an acid catalyst; in S. N. 392,126: the polymers resulting from the reaction of a vicinal glycol with an acetal in the presence of an acid catalyst; in S. N. 392,127: the polymers resulting from the reaction of polyfunctional linear formals in the presence of acid catalysts; and in S. N. 392,128: the polymers resulting from the interaction of 1,3-dioxolane with hydroxylated compounds in the presence of acid catalysts. It is understood that the above list of compounds which can be reacted with carbon monoxide represent but a few of the large number of cyclic acetals and formals and their polymers which may be reacted in accord with the invention to give esters and acids and other oxygenated organic compounds.

In order to increase the velocity of the reaction, it is recommended that a catalyst be employed. In general, a catalyst may be used in amounts ranging from 1% or less up to in the order of 1 mole thereof per mole of the compound reacted with the carbon monoxide. Acidic substances, generally, that is those which give in an aqueous medium a pH of less than 7, are suitable for catalyzing the reaction. Catalysts which are applicable include, for example, the inorganic acids and more particularly hydrochloric, sulfuric, and phosphoric acids; inorganic acidic salts such, for example, as potassium acid sulfate, sodium acid phosphate, and the non-metal halides such, for example, as boron fluoride, boron chloride, etc. Organic acids may likewise be employed, such, for example, as formic, acetic, glycolic, and paratoluenesulfonic acids.

When boron fluoride is used as the catalyst, it has been found that it may first be combined with the alkylene oxide or its polymer to be reacted and the resulting mixture reacted with carbon monoxide. It is not necessary that all of the cyclic acetal or its polymer to be reacted with carbon monoxide shall be combined with the boron fluoride prior to the reaction, for the reaction proceeds satisfactorily if the complex is present in the ratio of from 1 to 10 moles thereof per 100 moles of the total amount of cyclic acetal or its polymer present. Complexes of boron trifluoride with other compounds, such as water and particularly organic compounds, such, for example, as complexes of boron trifluoride with dimethyl ether, methanol, methyl methoxy acetate, glycolide and the like may likewise be employed. As has already been indicated boron trifluoride may be added directly to the cyclic acetals or their polymers and when the process is continued in this manner 0.5 mole to one mole of boron trifluoride per mole of the reactant may be employed. Higher or lower proportions may be used, but, generally, those indicated in the designated range cover the more practical ratios.

If desired the reaction may be carried out in the presence of an organic or inorganic solvent which is preferably substantially inert with respect to the carbon monoxide and catalyst employed. For this purpose solvents such as benzene, nitrobenzene, liquid sulfur dioxide and liquid carbon dioxide may be used. Organic acids such as acetic, propionic, glycolic, alkoxy acetic acids and the like may be used both as solvents and reactants, for with their use substituted products are often formed.

The carbon monoxide required for the synthesis may be conveniently derived from various commercial sources as, for example, from water gas, producer gas, etc., by liquefaction and other methods and for best results it should be relatively pure. The carbon monoxide should preferably be present in sufficient excess to insure an adequte supply thereof for absorption by the cyclic acetal.

The reaction product may be separated by fractional distillation after cooling the reaction mixture and if boron trifluoride has been used as the catalyst the various methods well known for its separation from the reaction product may be employed such, for example, as by differential pressure distillation by the addition of calcium fluoride, or by precipitation with anhydrous ammonia or other means.

The following examples will illustrate methods of practicing the invention although it will be understood that the invention is not limited to the examples. Parts are by weight unless otherwise indicated.

*Example 1.*—With cooling in an ice bath 53 parts of sulfuric acid was added slowly to 175 parts of 1,3-dioxolane with shaking. The dioxolane polymerized yielding a colorless viscous liquid. The reaction mixture was charged into a silver-lined pressure vessel and processed under 200–700 atmospheres CO pressure at a temperature between 88–122° C. The CO absorbed was shown by a 275 atmospheres pressure drop in 20 minutes. A solution of the product in methanol and ethyl ether mixture was treated with $Na_2CO_3$ to neutralize the sulfuric acid and the sodium sulfate formed was removed by filtration. The excess ethyl ether was evaporated and sufficient methanol added along with 3 parts sulfuric acid to bring the total quantity of methanol to 400 parts. Esterification was effected by boiling for 2 hours. Subsequent to neutralization of the catalyst with $NaOCH_3$, fractional distillation of the product gave 20 parts of methyl (beta-hydroxyethoxy) acetate, $HOCH_2CH_2OCH_2COOCH_3$, boiling point 64–69° C./1 mm. Saponification No. determined, 420; calculated for $HOCH_2CH_2OCH_2COOCH_3$

419.

*Example 2.*—A reaction mixture prepared by addition of 45 parts of BF₃ to 175 parts of 1,3-dioxolane cooled in an ice bath was charged into a silver-lined pressure vessel. Carbon monoxide pressure was maintained at 200–700 atmospheres over a period of 31 minutes at 56–60° C. Carbon monoxide absorption was shown by a 365 atmospheres pressure drop. Methyl (beta-hydroxyethoxy) acetate was prepared and isolated from the product as described in Example 1.

*Example 3.*—To 60 parts of concentrated sulfuric acid cooled in an ice bath was added 200 parts of solid polydioxolane and the mixture so obtained was processed under conditions simulating those set forth in Example 1. Methyl (beta-hydroxyethoxy) acetate was isolated from the product as described in Example 1.

If desired the invention may be carried out in a continuous manner; that is, by passing the reactant either co-current or counter-current to flow of carbon monoxide, the rates of flow being adjusted and coordinated with the pressure, temperature and catalyst employed to yield the desired degree of reaction. Carbon monoxide should be maintained at a suitable pressure as in the processes described in the examples and the temperature of the continuous reaction should be held in the desired range by suitable heating and/or cooling means. Intimate contact should be maintained at all times between the reactants and the carbon monoxide.

Because of the corrosive nature of the catalyst and reactants, it is desirable to carry out the process, particularly if the reaction is conducted at high temperatures, in vessels lined with silver, chromium, stainless steel and the like, while if the reaction is conducted in the neighborhood of room temperature, glass, silica, porcelain-lined, aluminum-lined, or copper-lined vessels may be employed.

The esters obtained in accord with this process may, simultaneously with or subsequent to the reaction, be hydrolyzed in the presence of a suitable catalyst such as sulfuric acid, hydrochloric acid, boron trifluoride and the like to the corresponding acid. While the hydrolysis may be carried out during the reaction, particularly when a low concentration of catalyst is employed, it is recommended that the hydrolysis step be carried out subsequent thereto, in order that it may be possible to employ conditions most favorable to hydrolysis.

In consideration of the above specification, it will be appreciated that many changes may be made in the details therein given without departing from the scope of the invention or sacrificing any of the advantages that may be derived therefrom.

I claim:

1. A process of preparing an alkyl ester which comprises reacting a cyclic formal with carbon monoxide in the presence of an acidic catalyst and subsequently esterifying the product.

2. A process for the preparation of an alkyl ester of a substituted acetic acid which comprises reacting 1,3-dioxolane with carbon monoxide in the presence of a catalyst which gives in aqueous solution a pH of less than 7 and subsequently esterifying the product.

3. A process for the preparation of beta(hydroxyethoxy) acetic acid methyl ester which comprises slowly heating 53 parts of concentrated sulfuric acid with 175 parts of 1,3-dioxolane while cooling, polymerizing the 1,3-dioxolane and reacting it with carbon monoxide at a pressure between 200 and 700 atmospheres and a temperature between 88 and 122° C. and esterifying to the methyl ester with methanol.

4. A process for the preparation of an oxygenated organic compound which comprises polymerizing 1,3-dioxolane by heating in the presence of a catalyst which gives in aqueous solution a pH of less than 7, reacting the resulting product with carbon monoxide under elevated temperatures and superatmospheric pressures, and subsequently esterifying the resulting product with an aliphatic alcohol.

5. A process for the preparation of methyl (beta-hydroxyethoxy) acetate which comprises polymerizing 1,3-dioxolane by heating in the presence of sulfuric acid as the catalyst, reacting the resulting product with carbon monoxide at a temperature between 88 and 122° C. and under a pressure between 200 and 700 atmospheres and subsequently esterifying the resulting product with methanol.

WILLIAM F. GRESHAM.